US007963532B2

(12) United States Patent  (10) Patent No.: US 7,963,532 B2
Feitel  (45) Date of Patent: Jun. 21, 2011

(54) TILTING PAINT SPRAY PUMP AND CART

(75) Inventor: Ann Catherine Feitel, Plymouth, MN (US)

(73) Assignee: Titan Tool, Inc., Oakland, NJ (US)

( * ) Notice: Subject to any disclaimer, the term of this patent is extended or adjusted under 35 U.S.C. 154(b) by 239 days.

(21) Appl. No.: 11/924,319

(22) Filed: Oct. 25, 2007

(65) Prior Publication Data

US 2008/0106052 A1  May 8, 2008

Related U.S. Application Data

(60) Provisional application No. 60/864,306, filed on Nov. 3, 2006.

(51) Int. Cl.
*B62B 1/12* (2006.01)
(52) U.S. Cl. .................. 280/47.18; 280/47.24
(58) Field of Classification Search ............ 280/47.18, 280/47.19, 47.24
See application file for complete search history.

(56) References Cited

U.S. PATENT DOCUMENTS

| | | | | |
|---|---|---|---|---|
| 2,231,229 A * | 2/1941 | Spreng | ............... | 222/626 |
| 3,940,065 A * | 2/1976 | Ware et al. | ............... | 239/146 |
| 4,003,504 A * | 1/1977 | Johnson et al. | ............... | 222/626 |
| 4,624,602 A * | 11/1986 | Kieffer et al. | ............... | 404/94 |
| 4,717,276 A * | 1/1988 | O'Brien et al. | ............... | 401/197 |
| 5,217,238 A * | 6/1993 | Cyphers et al. | ............... | 280/47.18 |
| 5,263,789 A * | 11/1993 | Torntore et al. | ............... | 404/93 |
| 5,286,045 A * | 2/1994 | Cyphers et al. | ............... | 280/47.18 |
| 5,318,314 A | 6/1994 | Cyphers et al. | | |
| 5,346,370 A * | 9/1994 | Krohn | ............... | 417/223 |
| 5,441,297 A * | 8/1995 | Krohn et al. | ............... | 280/655 |
| 6,488,846 B1 * | 12/2002 | Marangi | ............... | 210/232 |
| 7,071,429 B1 * | 7/2006 | Anderson et al. | ............... | 200/81 R |
| 7,240,909 B2 * | 7/2007 | Robens | ............... | 280/47.24 |
| D580,518 S * | 11/2008 | Johnson et al. | ............... | D23/225 |
| 7,458,601 B2 * | 12/2008 | Miller et al. | ............... | 280/651 |
| 7,475,888 B2 * | 1/2009 | Craig et al. | ............... | 280/47.18 |
| 2008/0106052 A1 * | 5/2008 | Feitel | ............... | 280/47.17 |
| 2008/0136131 A1 * | 6/2008 | Sorg et al. | ............... | 280/47.18 |

* cited by examiner

*Primary Examiner* — Jeffrey J Restifo
(74) *Attorney, Agent, or Firm* — Faegre & Benson LLP

(57) ABSTRACT

A paint pump and cart having a movable carriage to enable tilting of the paint pump secured to the carriage via a pivot mechanism without tilting the remainder of cart. A latching mechanism having a spring biased pin received in one of a pair of apertures provides selective retention of the carriage in an operating or loading position and the latching mechanism is operable to release the carriage to move between the operating and loading positions.

9 Claims, 22 Drawing Sheets

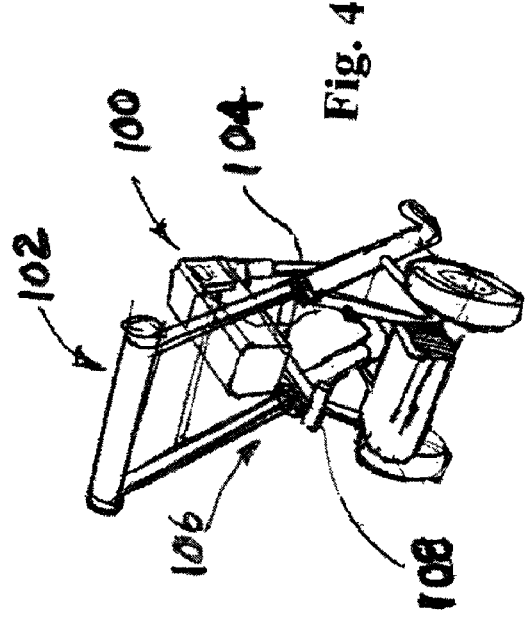
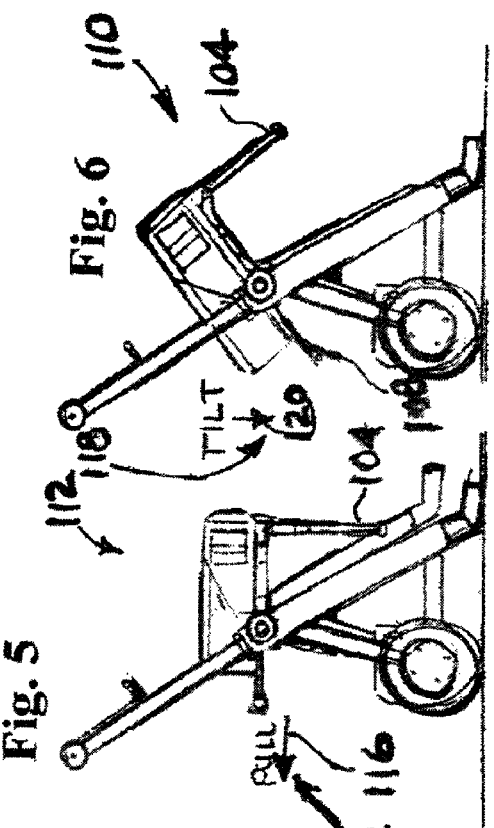
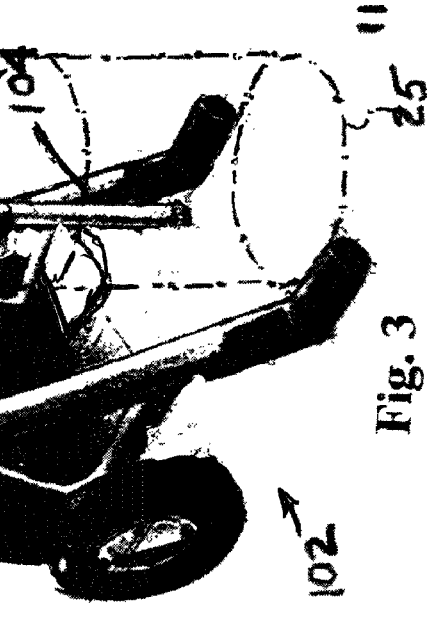

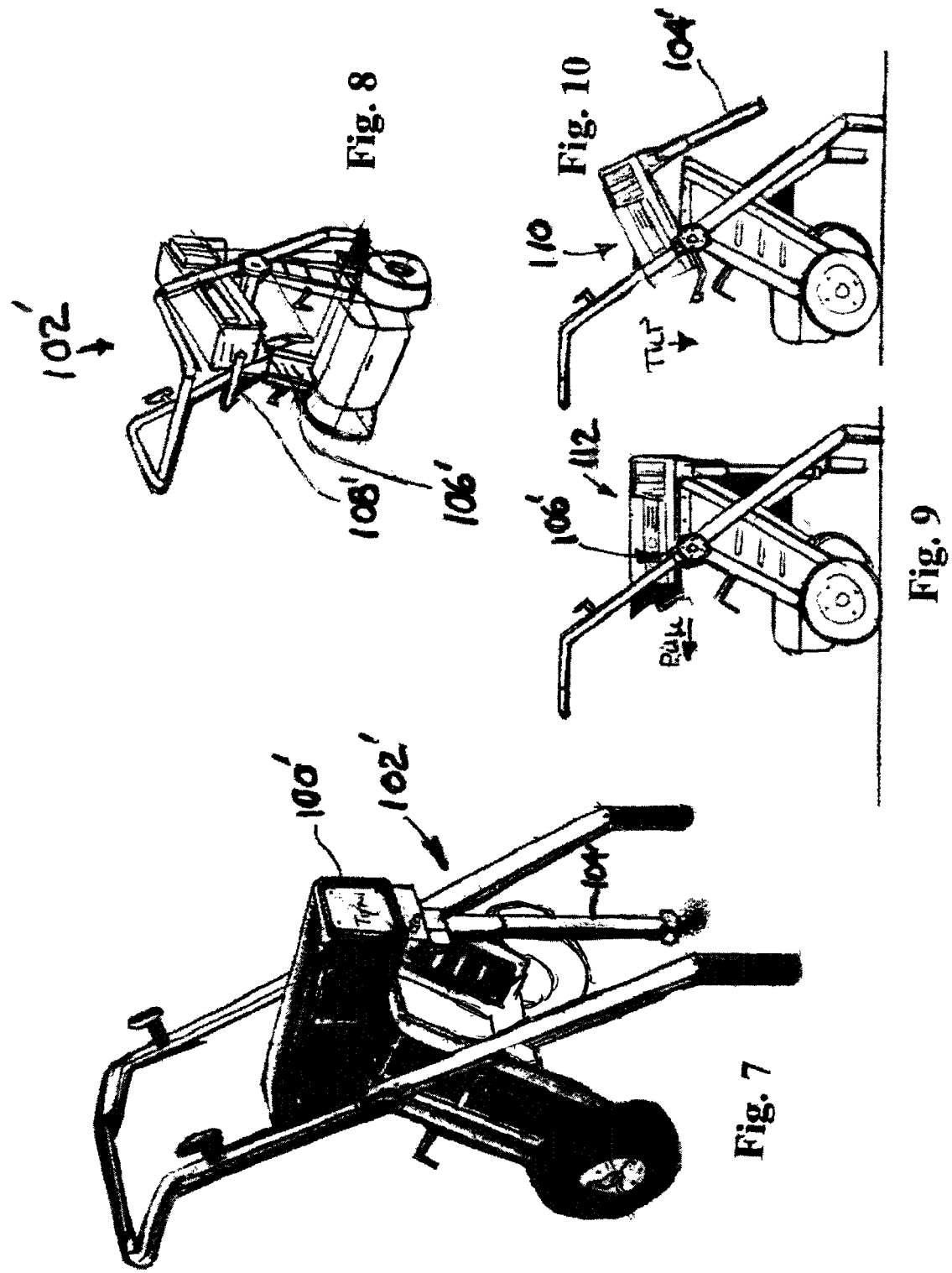

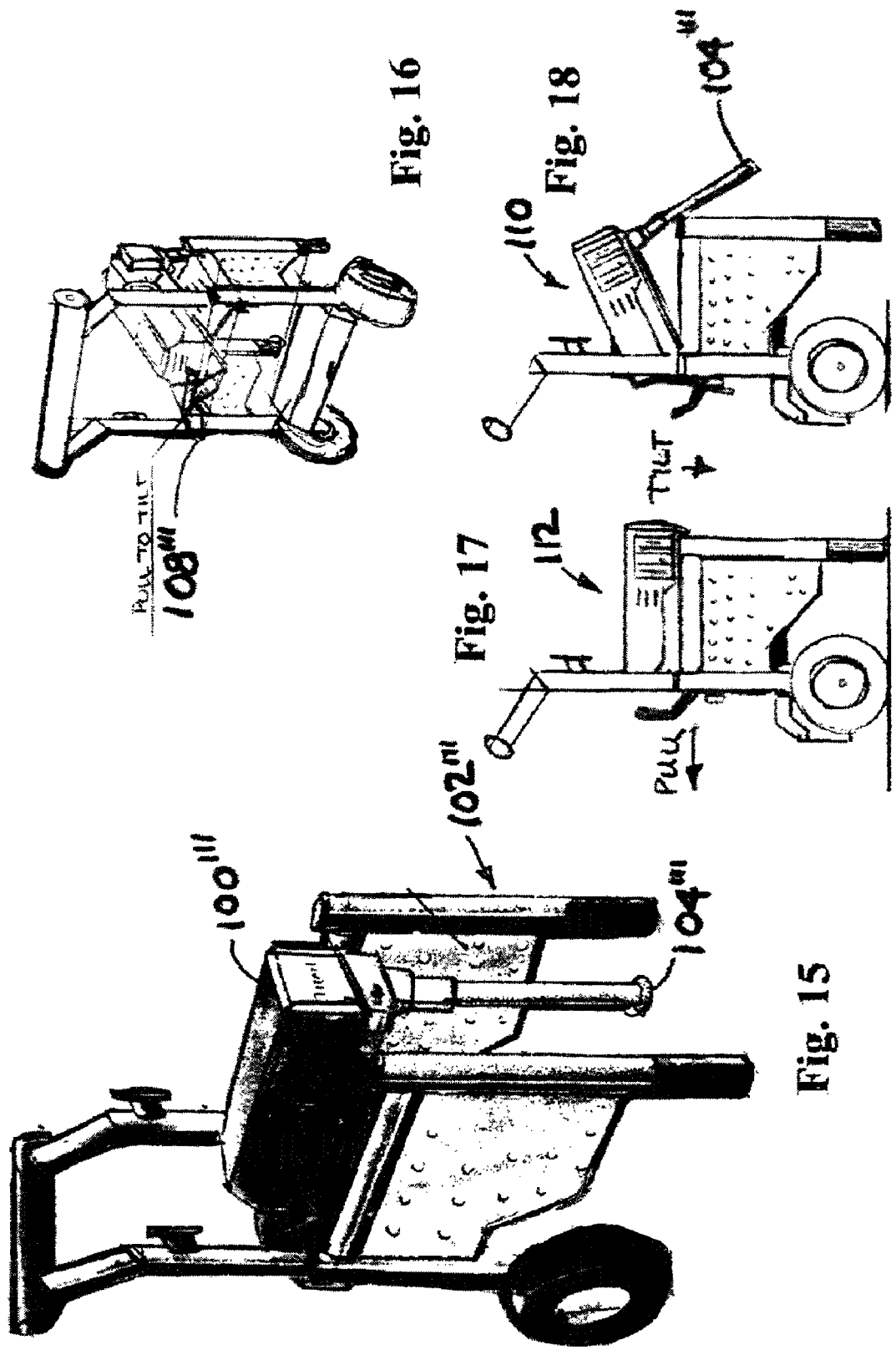

US 7,963,532 B2

TILTING PAINT SPRAY PUMP AND CART

CROSS REFERENCE TO RELATED APPLICATION

This application claims the benefit of U.S. Provisional Application No. 60/864,306 filed Nov. 3, 2006, the entire contents of which are hereby incorporated by reference.

BACKGROUND OF THE INVENTION

In the past, airless paint pumps were often permanently and non-adjustably secured to a cart, for example, as shown in FIGS. 1 and 2, taken from U.S. Pat. No. 4,003,504, the entire contents of which are hereby expressly incorporated by reference. In order to insert the pump suction tube or inlet conduit 13 into a paint container 25, the cart or pump support platform 15 was tilted back, the suction tube was positioned over the paint container, and then the cart was tilted forward (as shown in FIG. 1) to place a free end 26 of the suction tube 13 in the paint in container 25. The resulting operating position is shown in a partially cutaway view in FIG. 2.

SUMMARY OF THE INVENTION

The present invention is an improvement over the prior art and provides a pivoting connection between the pump and the cart, allowing the pump to be moved from a pumping position to a loading position and vice versa, to provide more convenience to a user, in that the cart need not be tilted to put the suction tube into the paint container.

BRIEF DESCRIPTION OF THE DRAWINGS

FIG. 3 is a first perspective view of a first embodiment of the present invention showing a paint pump mounted to a first version of a cart useful in the practice of the present invention.

FIG. 4 is a second perspective view of the first embodiment of FIG. 3.

FIG. 5 is a right side elevation view of the paint pump and cart of FIG. 3 showing the assembly in an operating position.

FIG. 6 is a right side elevation view similar to that of FIG. 5, except with the assembly shown in a loading position.

FIG. 7 is a first perspective view of a second embodiment of the present invention showing a paint pump mounted to a second version of a cart useful in the practice of the present invention.

FIG. 8 is a second perspective view of the second embodiment of FIG. 7.

FIG. 9 is a right side elevation view of the paint pump and cart of FIG. 7 showing the assembly in an operating position.

FIG. 10 is a right side elevation view similar to that of FIG. 9, except with the assembly shown in a loading position.

FIG. 15 is a first perspective view of a fourth embodiment of the present invention showing a paint pump mounted to a fourth version of a cart useful in the practice of the present invention.

FIG. 16 is a second perspective view of the fourth embodiment of FIG. 15.

FIG. 17 is a right side elevation view of the paint pump and cart of FIG. 15 showing the assembly in an operating position.

FIG. 18 is a right side elevation view similar to that of FIG. 17, except with the assembly shown in a loading position.

DETAILED DESCRIPTION

Figure 1:
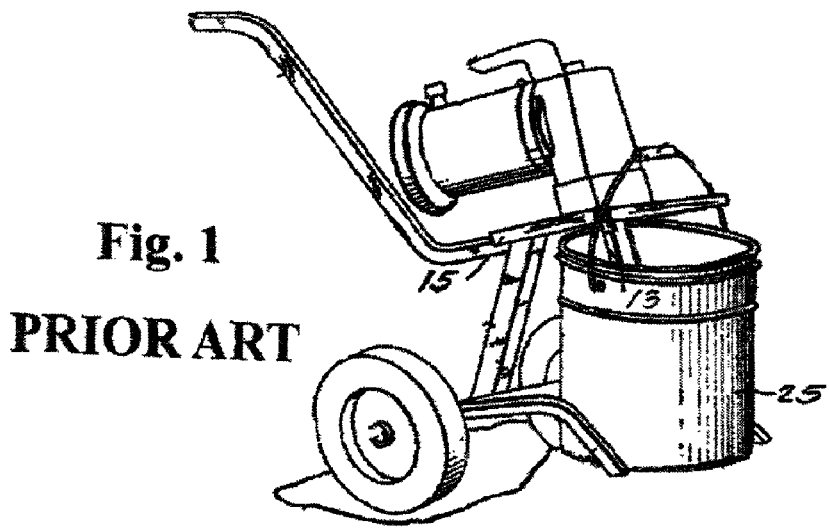
FIG. 1 is a perspective view of a prior art pump mounted on a cart, shown with the cart partially tipped back with respect to the paint container.
Figure 2:
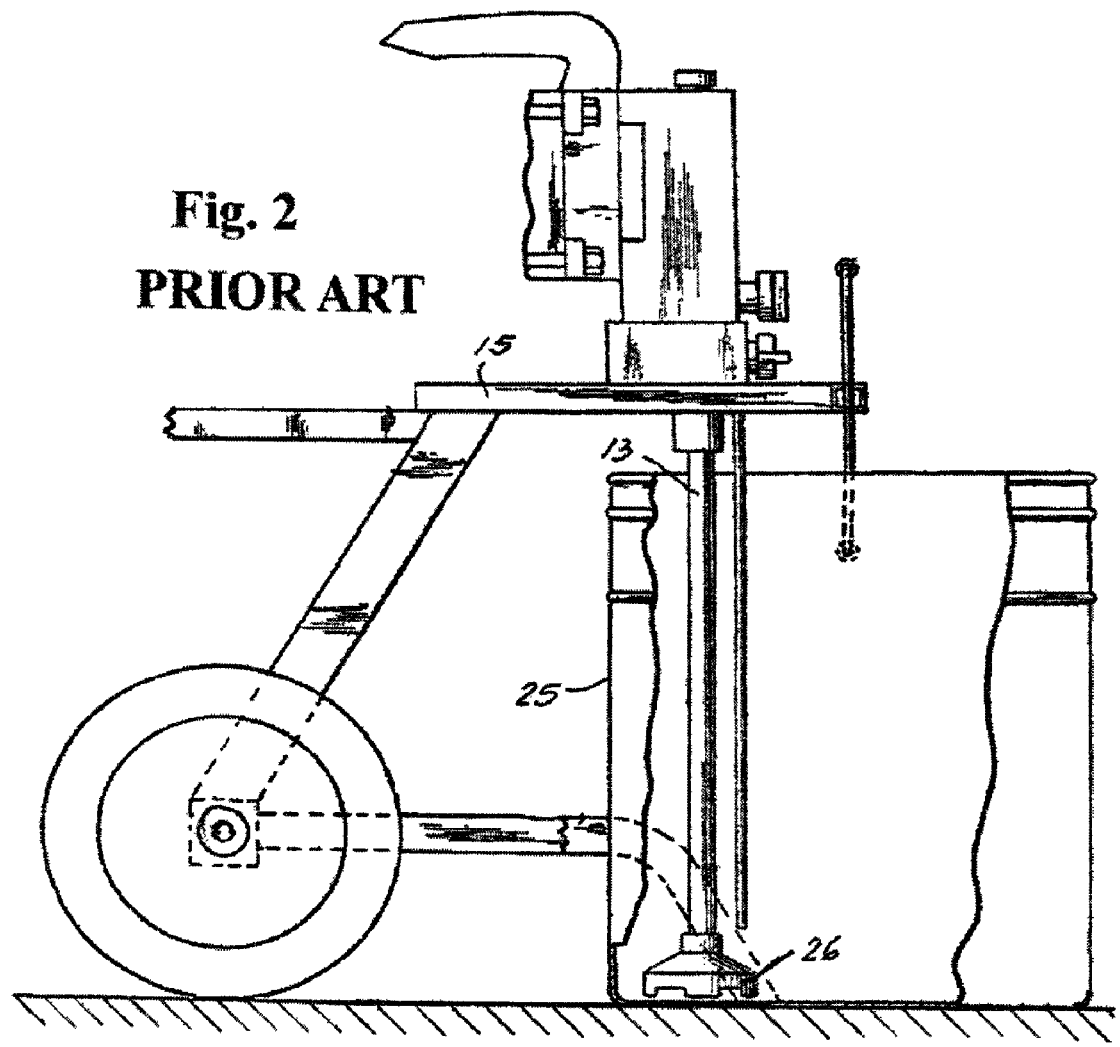
FIG. 2 is a side elevation view, cutaway to show the suction tube positioned in the paint container for the prior art pump and cart of FIG. 1.
Figure 11:
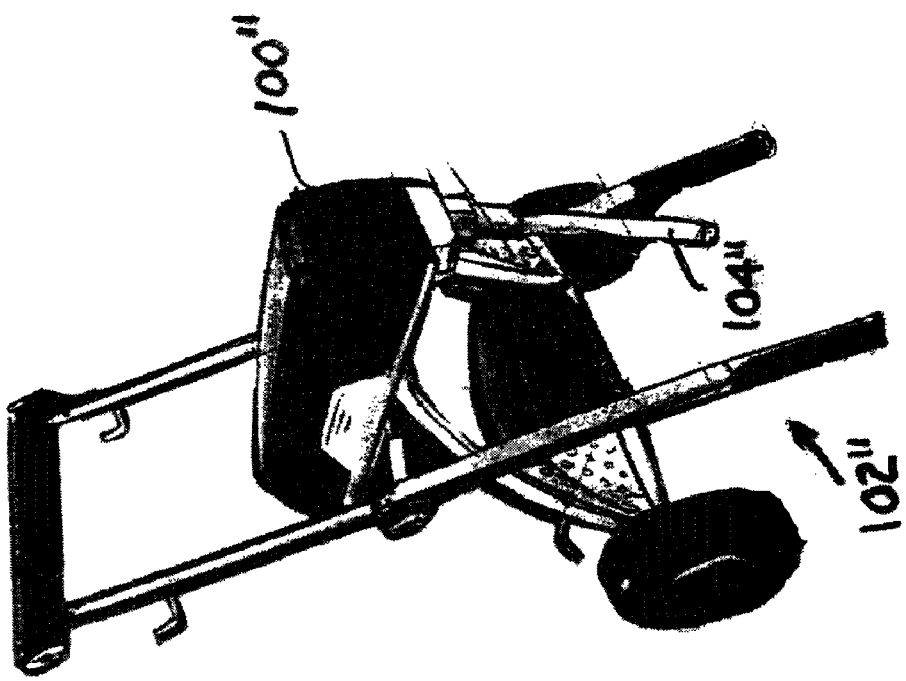
FIG. 11 is a first perspective view of a third embodiment of the present invention showing a paint pump mounted to a third version of a cart useful in the practice of the present invention.
Figure 12:
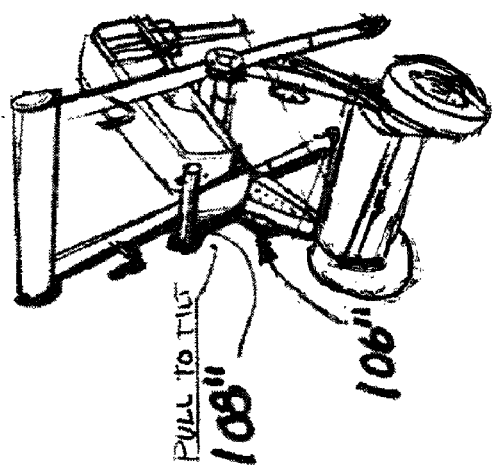
FIG. 12 is a second perspective view of the third embodiment of FIG. 11.
Figure 14:
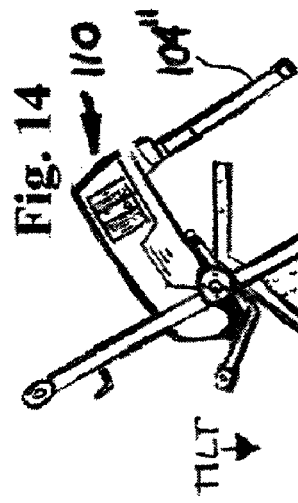
FIG. 14 is a right side elevation view similar to that of FIG. 13, except with the assembly shown in a loading position.
Figure 13:
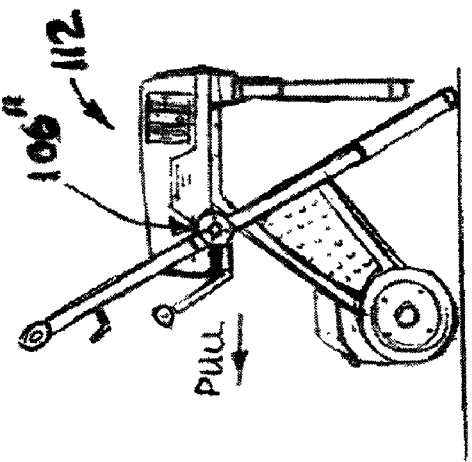
FIG. 13 is a right side elevation view of the paint pump and cart of FIG. 11 showing the assembly in an operating position.

Referring now to the Figures, and most particularly to FIGS. 3-18, the present invention includes a paint pump 100 mounted to a cart 102. Pump 100 may be an airless paint spray pump with a suction tube 104, sized and located to be received in a conventional five gallon paint container such as container 25, shown in solid in FIGS. 1 and 2 and outlined in phantom in FIG. 3. Although the suction tube 104 in FIGS. 3-18 is shown in a shortened version, it is to be understood that tube 104 is preferably sized to reach to the bottom of container 25, as shown in FIGS. 1 and 2.

In the practice of the present invention, a latching hinge or pivot mechanism 106 is provided between the pump 100 and the cart 102. The pump 102 is able to be released by a handle 108 to pivot back to a loading position 110, as depicted in FIG. 6, and mechanically latch at that position to enable the suction tube 104 of the pump 100 to clear the height of a 5-gallon pail 25.

The pivot mechanism 106 may mechanically latch in both the loading (up) position 110 and in an operating (down) position 112, shown respectively in FIGS. 6 and 5.

In order to operate the latching hinge 106, handle 108 is pulled in a first direction 114 indicated by arrow 116 to release the pump 100 from a latched condition while the pump is in the operating position 112. The handle 108 is then moved in a second direction 118, indicated by arrow 120, to tilt the pump 100 from the operating position 112 to the loading position 110, after which the handle may be released, allowing the pump 100 to return to a latched condition in the up position 110. Once the suction tube 104 is positioned with respect to the paint container 25, the handle 108 may be pulled, unlatching the pump, and then the handle is preferably moved in a direction opposite to that of arrow 120, to return the pump to the down or operating position 112, after which the handle may be moved in a direction opposite to arrow 116 to allow the pump to again become latched to the cart in the down or operating position 110.

Conventional latching and unlatching mechanisms may be used in the practice of the present invention, if desired.

Other embodiments are shown in FIGS. 7-18, with like parts numbered in correspondence with the first embodiment shown in FIGS. 3-6.

A still further embodiment of the present invention is shown in FIGS. 19-36, with like parts numbered in correspondence with the first embodiment, except incremented by 100.

Figure 19:
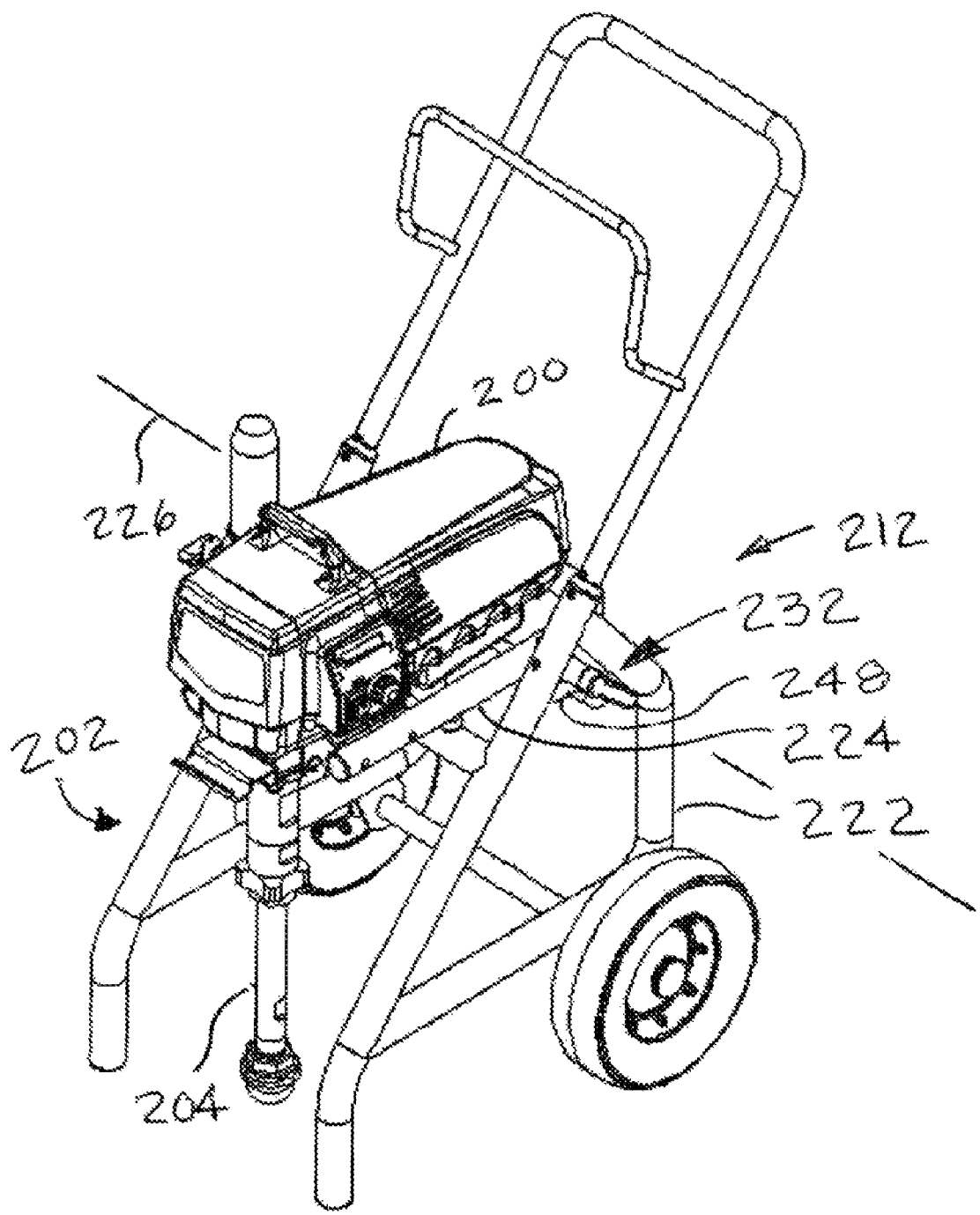
FIG. 19 is a perspective view of another embodiment of the paint pump and cart of the present invention showing the assembly in an operating position.
Figure 20:
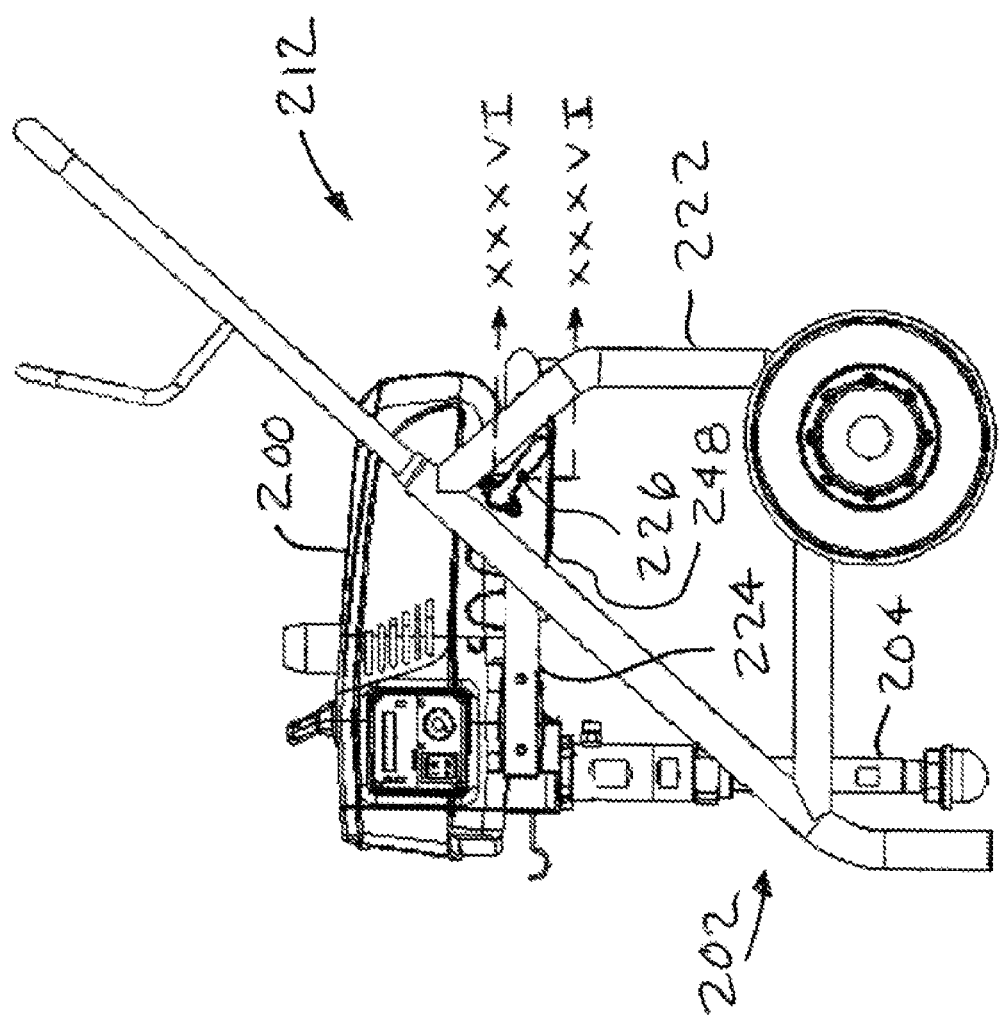
FIG. 20 is a right side elevation view of the pump and cart of FIG. 19.
Figure 21:
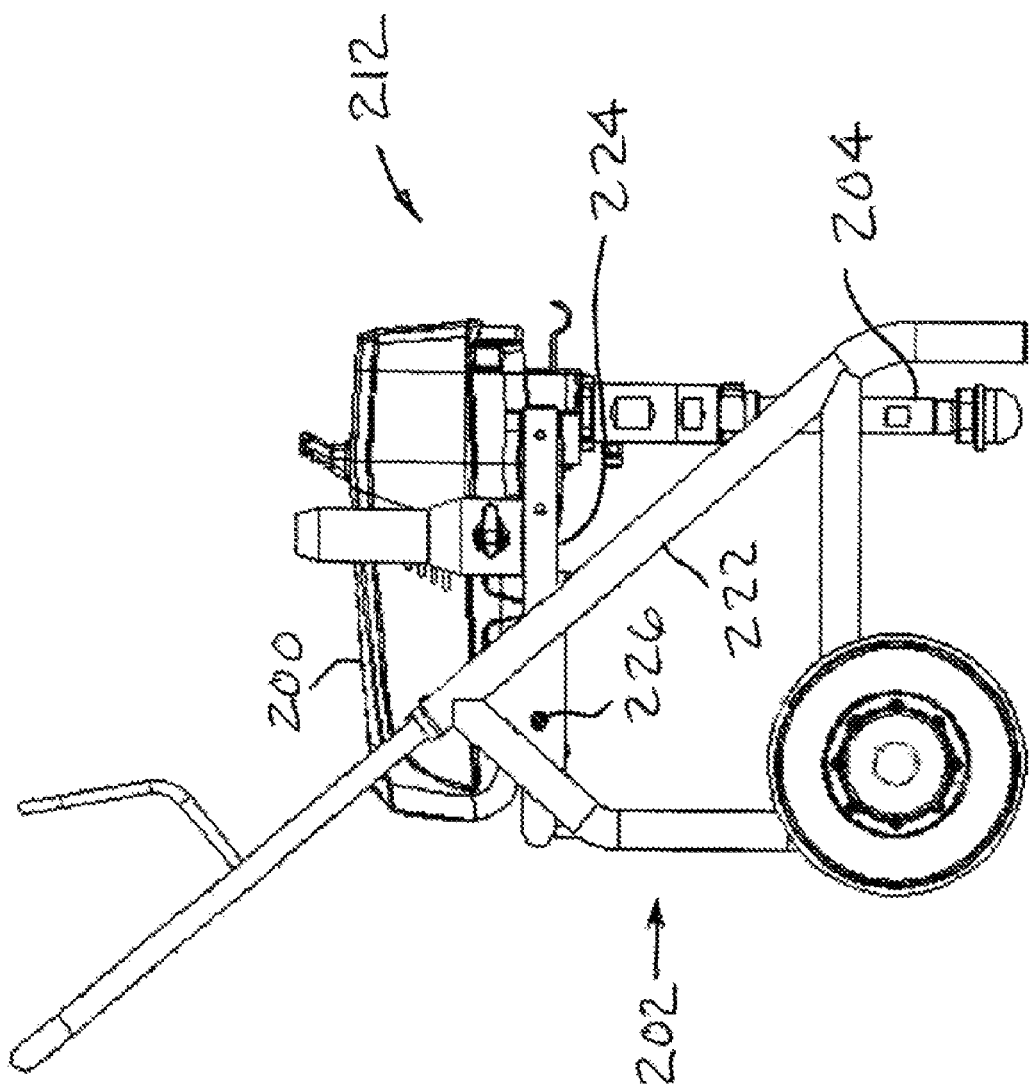
FIG. 21 is a left side elevation view of the pump and cart of FIG. 19.
Figure 22:
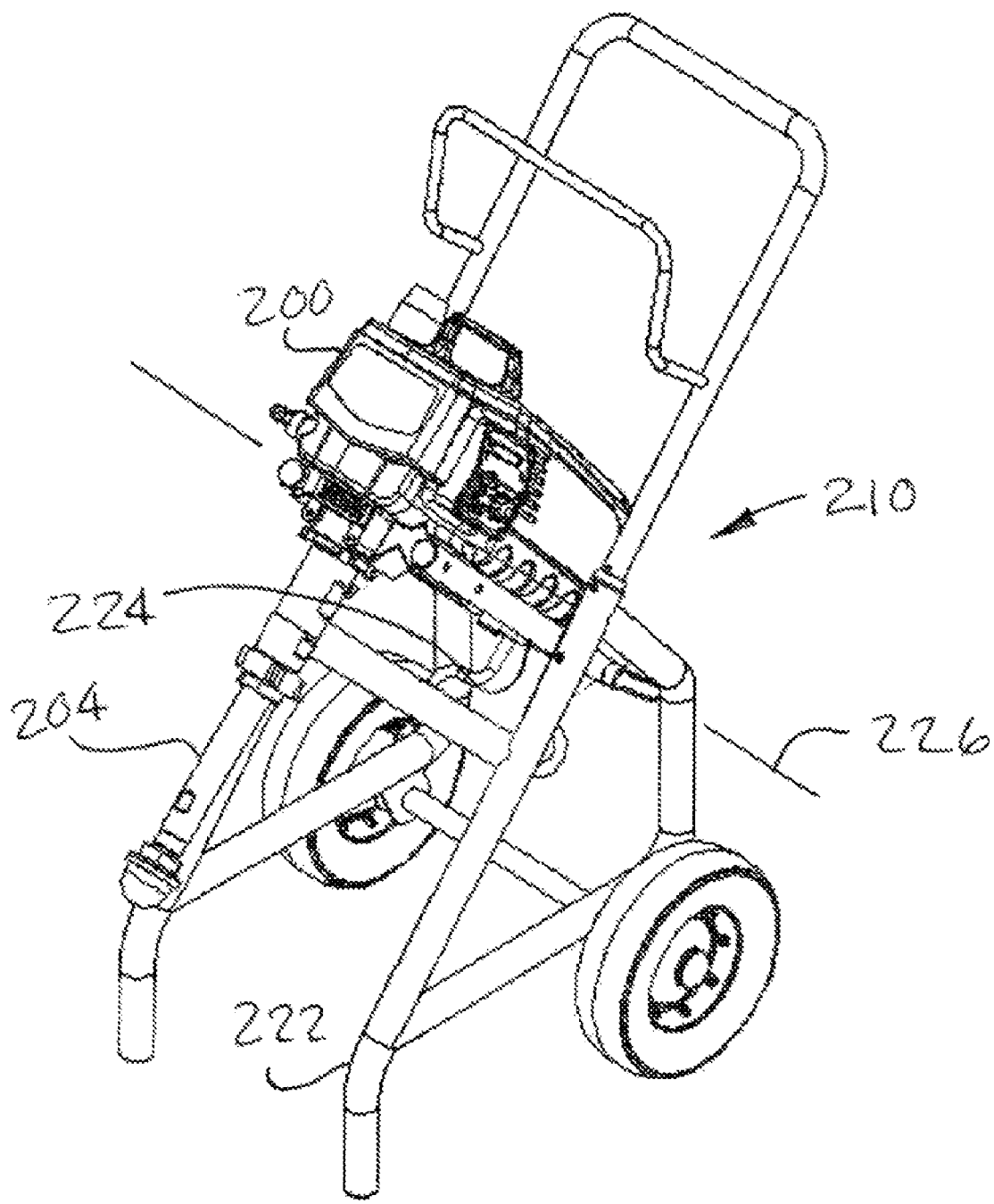
FIG. 22 is a perspective view of the pump and cart of FIG. 19, with the assembly in a loading position.
Figure 23:
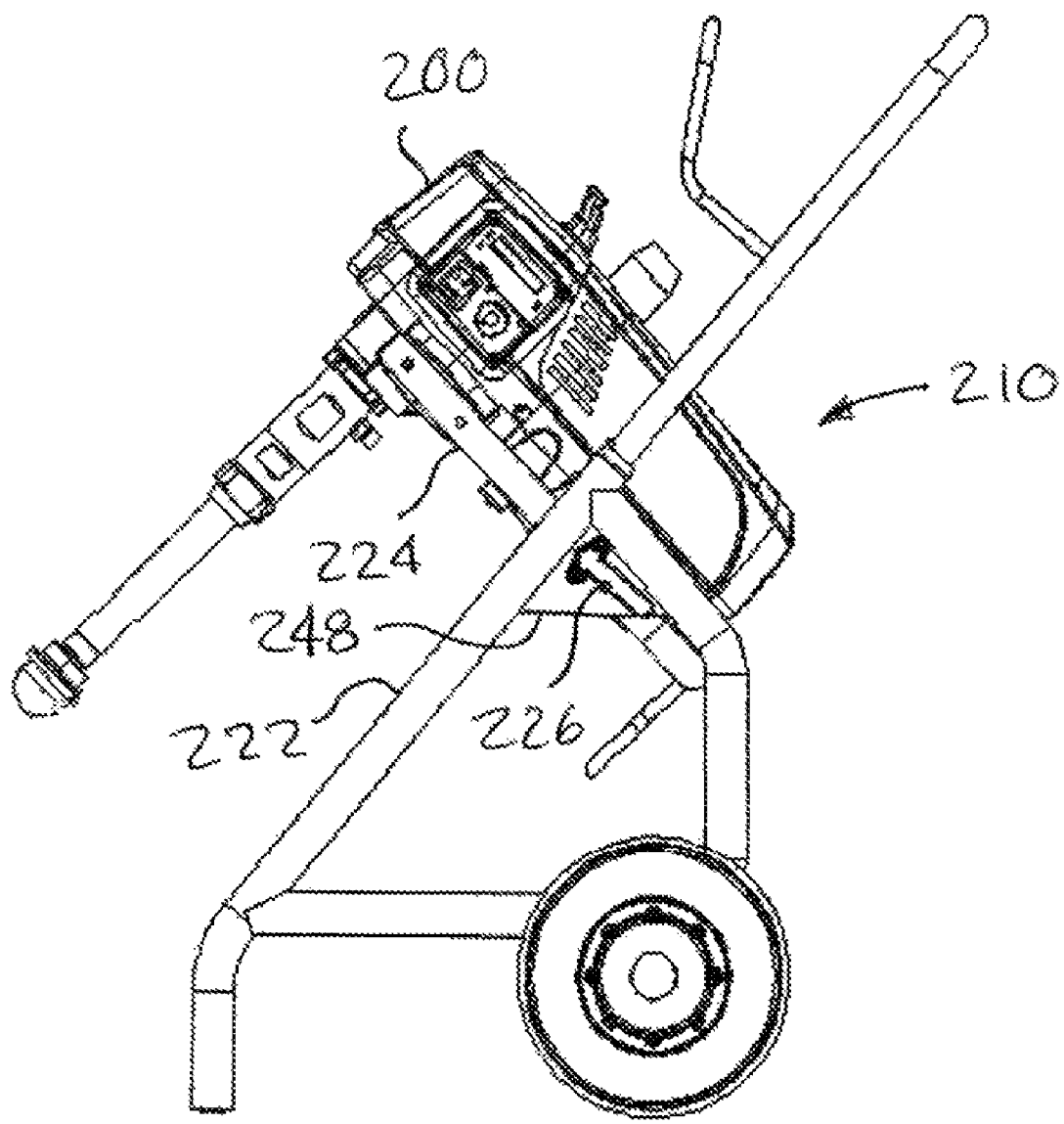
FIG. 23 is a right side elevation view of the pump and cart of FIG. 22, also showing the assembly in the loading position.
Figure 24:
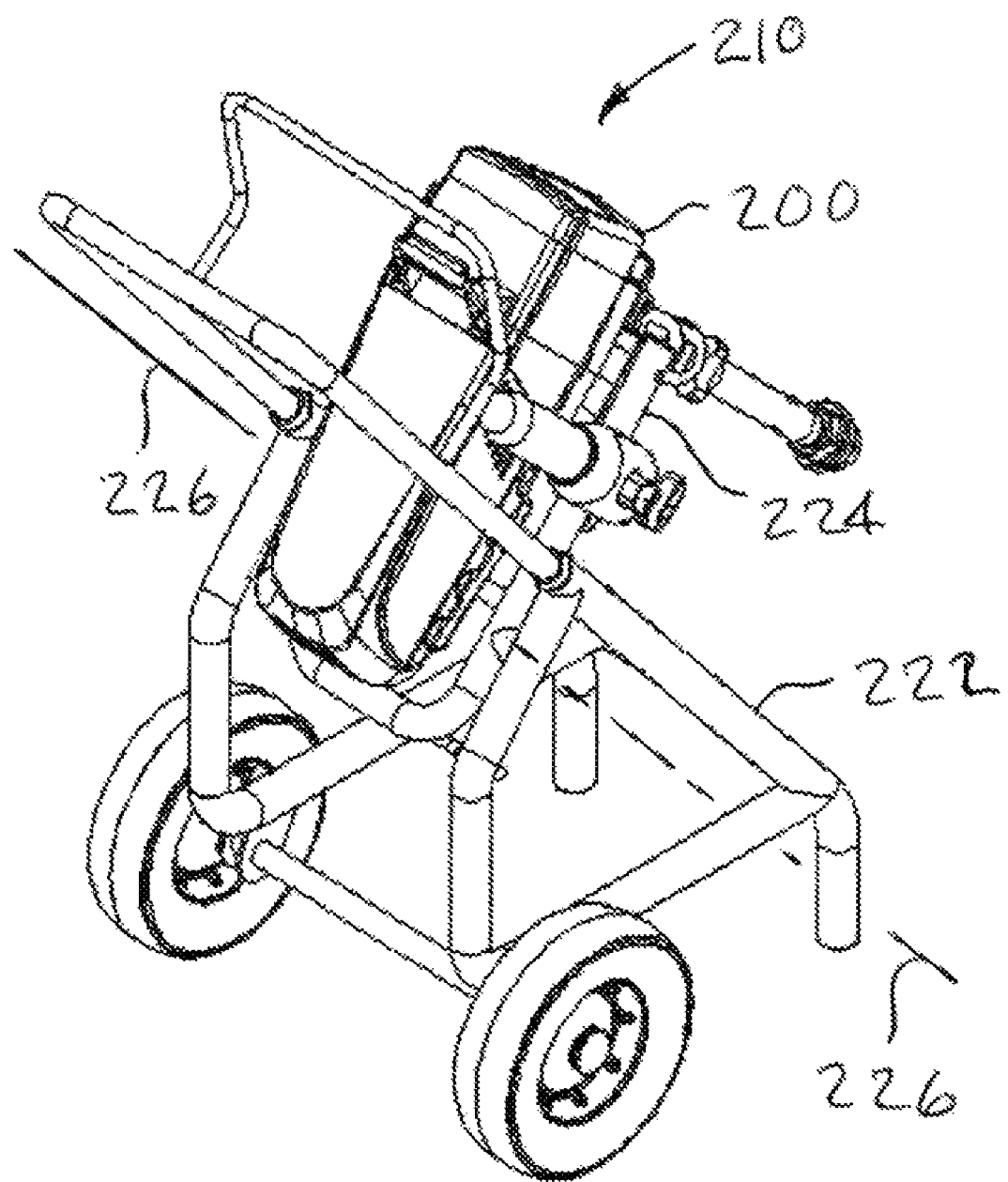
FIG. 24 is a rear perspective view of the pump and cart of FIG. 22, also showing the assembly in the loading position.
Figure 25:
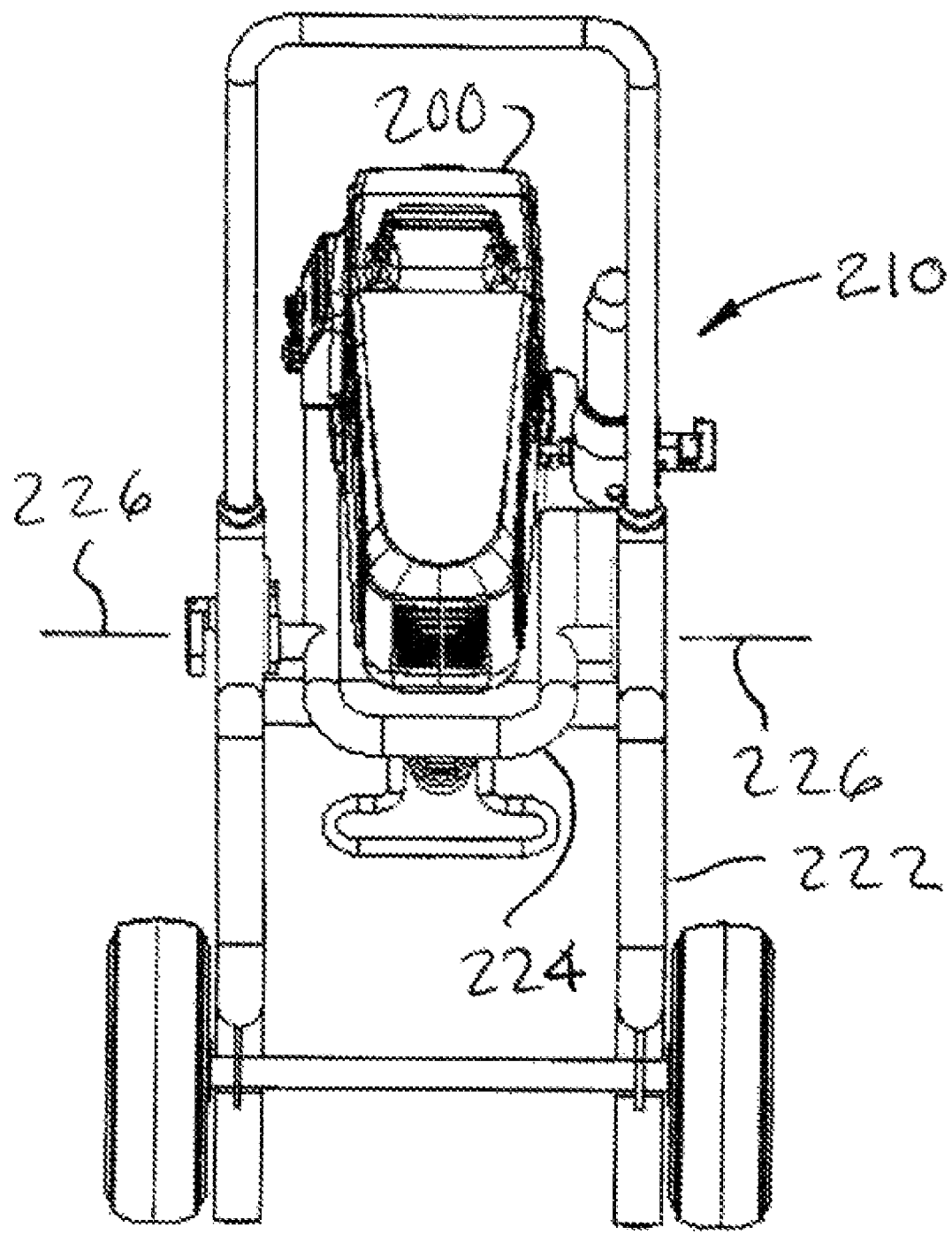
FIG. 25 is a rear elevation view of the pump and cart of FIG. 22, with the assembly in the loading position.
Figure 26:
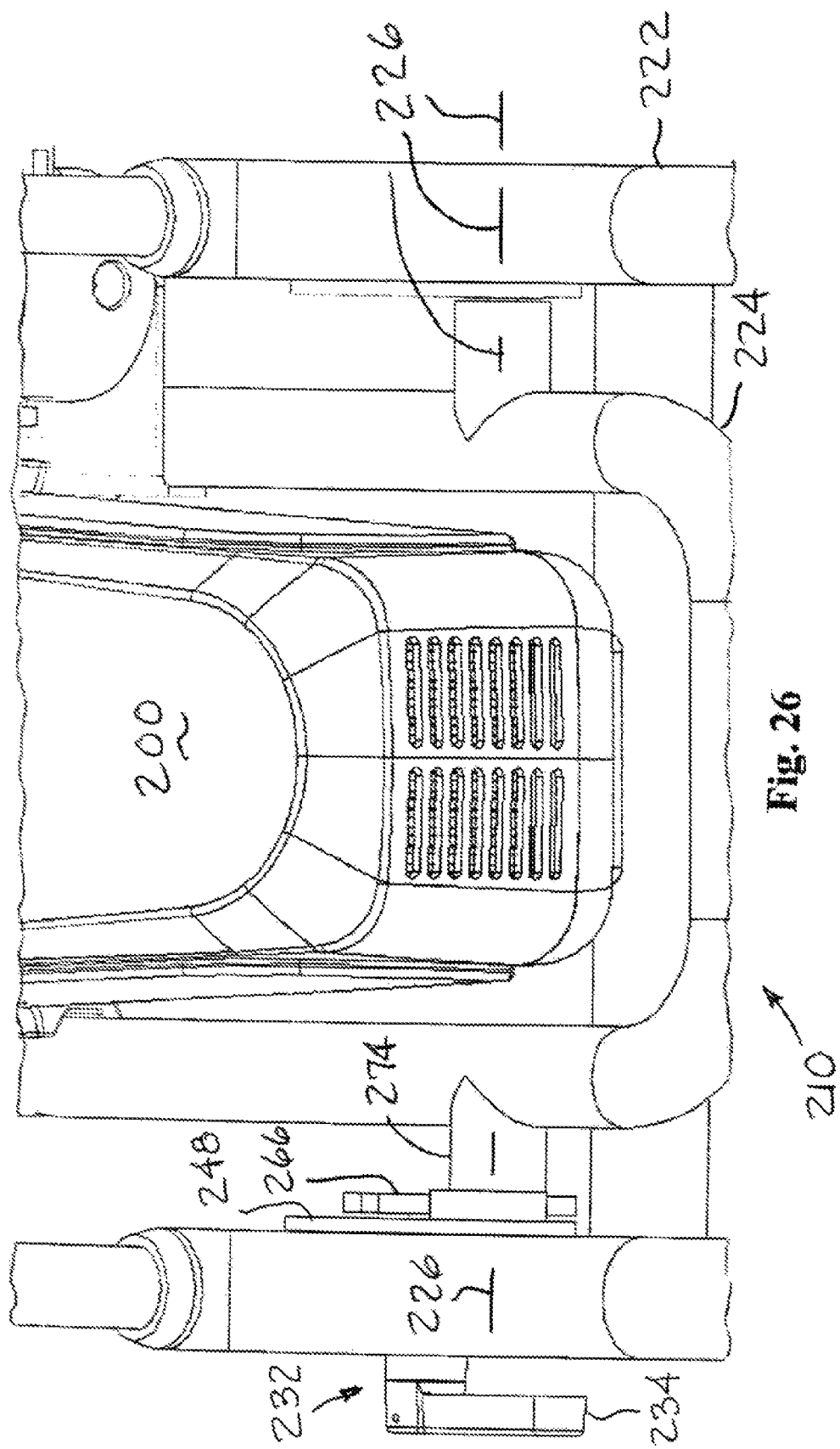
FIG. 26 is a fragmentary view of a portion of the pump and cart of FIG. 25, enlarged to show certain features of the present invention.
Figure 27:
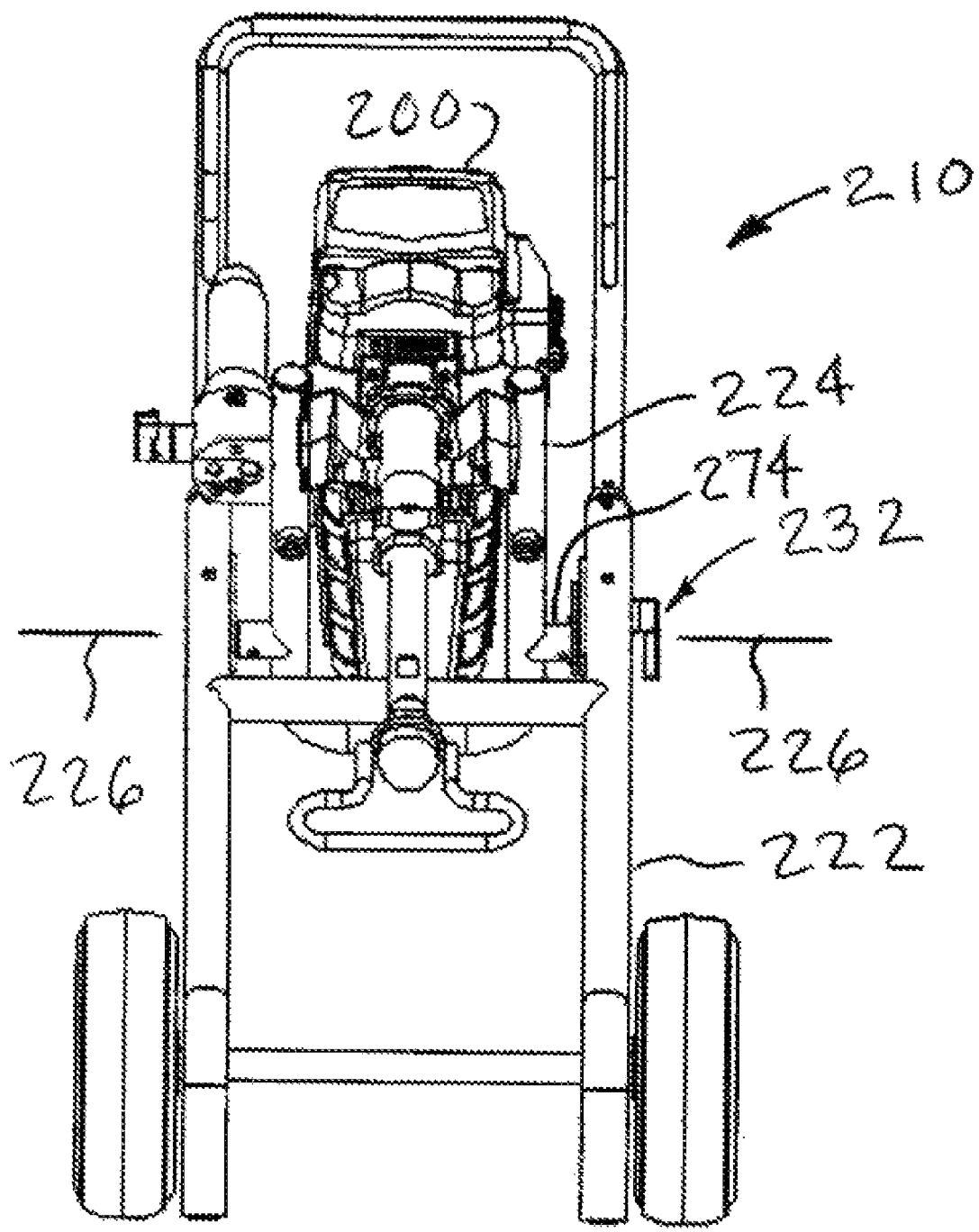
FIG. 27 is a front elevation view of the pump and cart of FIG. 22, with the assembly in the loading position.
Figure 28:
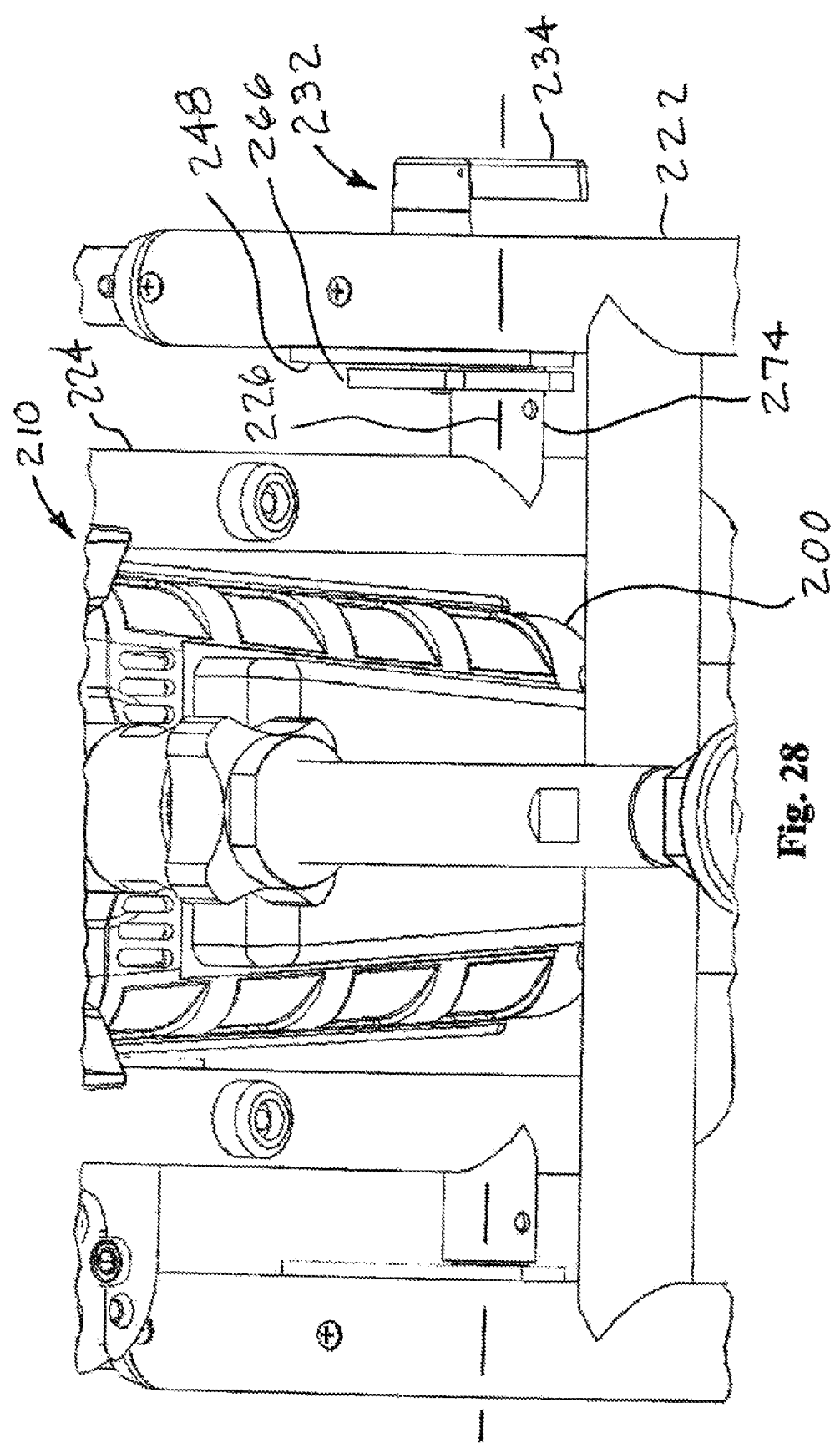
FIG. 28 is a fragmentary view of a portion of the pump and cart of FIG. 27, enlarged to show certain features of the present invention.
Figure 29:
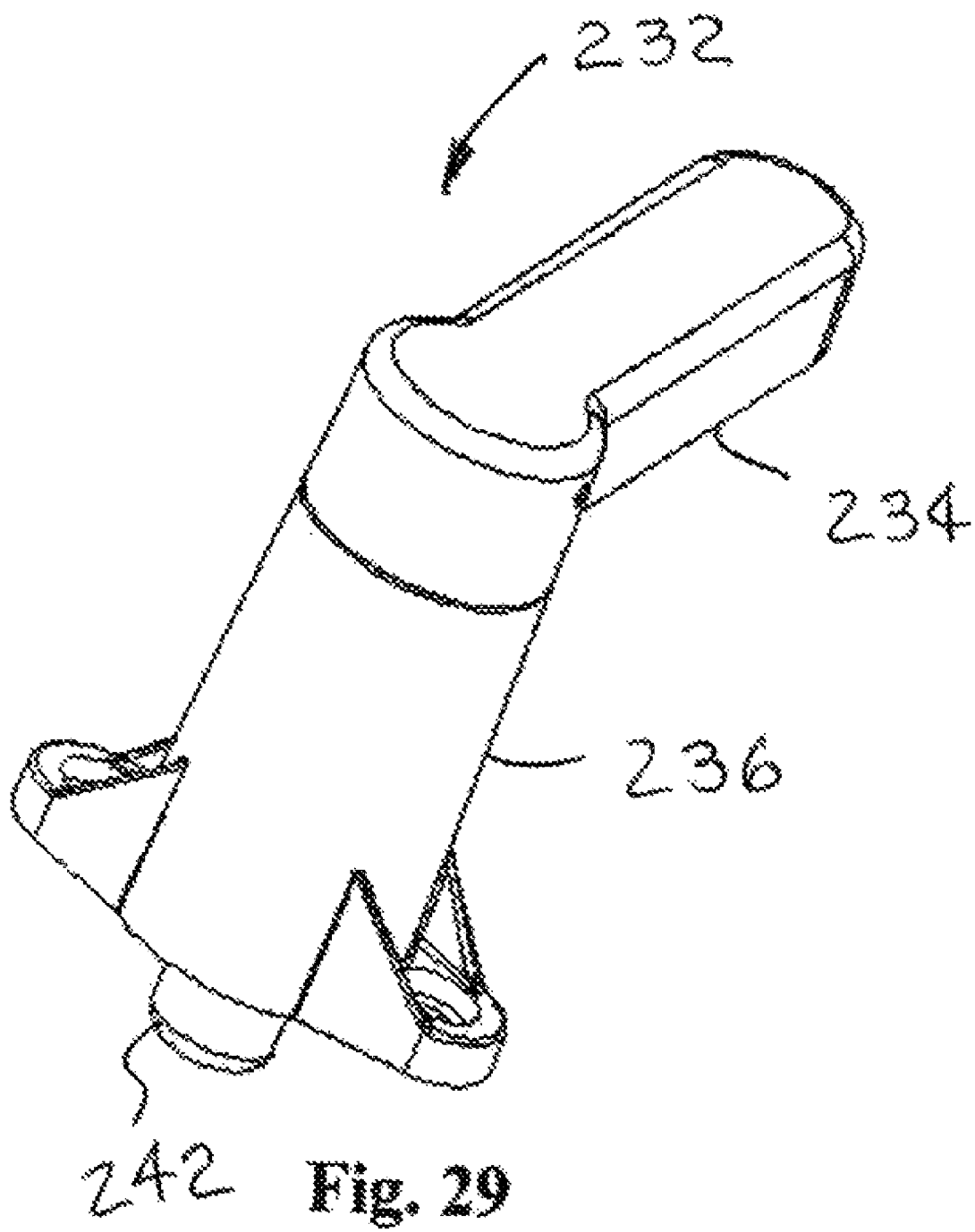
FIG. 29 is an enlarged assembly view of a latch mechanism useful in the practice of the present invention.
Figure 30:
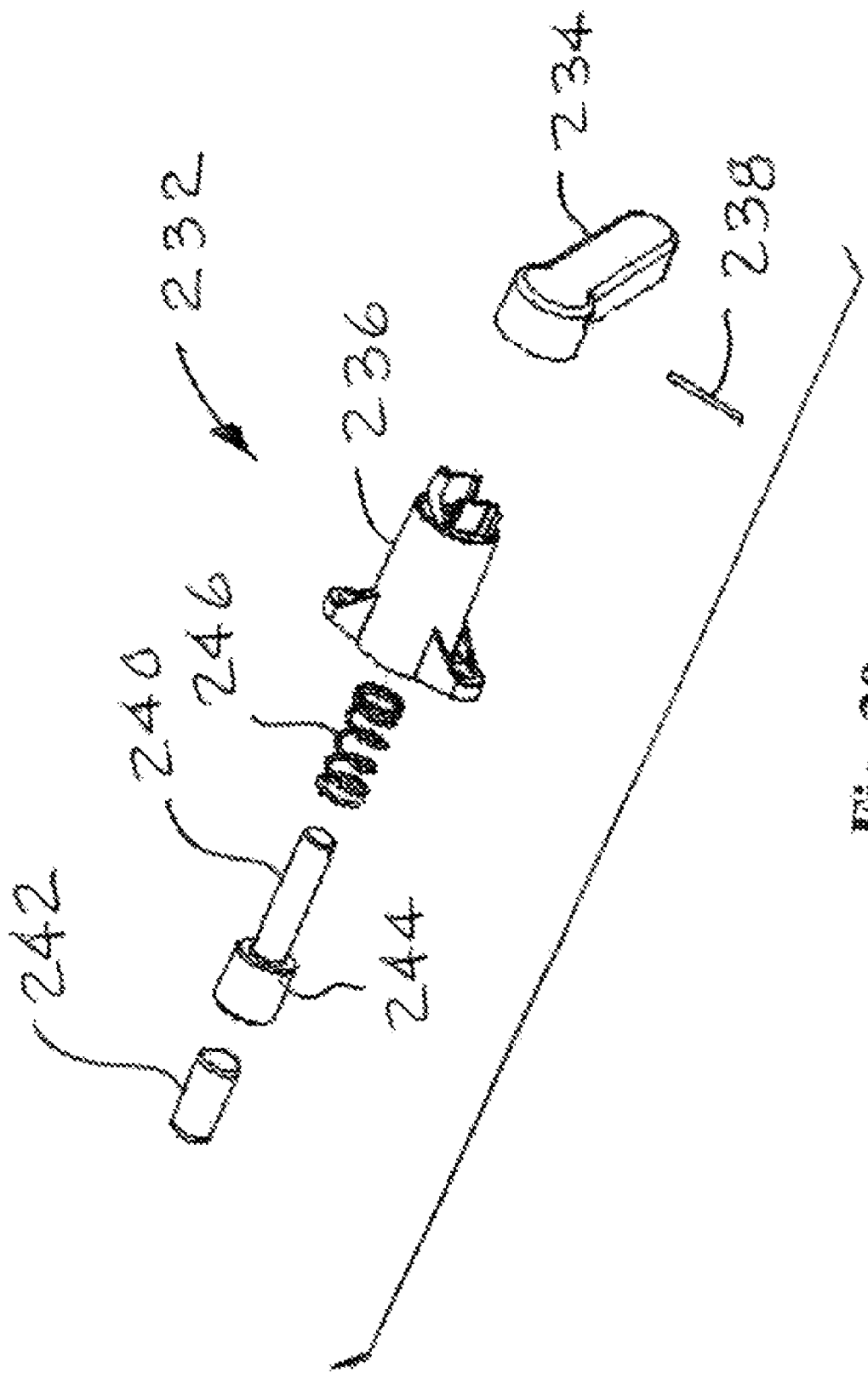
FIG. 30 is an exploded view of the latch mechanism of FIG. 29.

Referring now most particularly to FIGS. 19-21, a paint pump 200 and cart 202 may be seen. It is to be understood that cart 202 has a base frame 222 supporting a carriage 224 pivotably mounted on the base frame, with the pump 200 mounted on the carriage 224. Carriage 224 and pump 200 are mounted to frame 222 to pivot about a pivot axis 226, shown in FIGS. 19-29 and 35 and 36. As may be seen most clearly in FIG. 35, carriage 224 is preferably U-shaped, although other shapes may be used in the practice of the present invention.

An assembly 230 of the pump 200 and cart 202 is shown in FIGS. 19-21 in an operating position 212, and is shown in FIGS. 22-28 in a loading position 210. As with the previously described embodiments, the operating position 212 is the position in which a suction tube 204 is received in a paint container (not shown in FIGS. 19-21) for painting operation. The operating position 212 may also be used to transport or store the assembly 230, if desired. Similar to the previously described embodiments, the loading position 210 permits the suction tube 204 to be elevated to ease the process of positioning the suction tube 204 over a lip of a paint container (typically a 5 gallon type) and inserting the tube 204 into the paint container (or reversing the process at the completion of painting, when it is desired to withdraw the suction tube 204 from the paint container).

Referring now to FIGS. 29-35, a latch mechanism 232 may be seen. Latch mechanism 232 may include a handle 234 and a latch housing 236. Handle 234 is preferably secured by a drive pin 238 to a dowel carrier 240 carried in housing 236. Dowel carrier 240 preferably has a hardened steel dowel 242 pressed into an enlarged end 244 of the carrier 240. A return spring 246 acts between the dowel carrier 240 and the latch housing 236 to urge the dowel carrier axially in a direction away from the handle 234. Latch mechanism 232 is preferably mounted to a latch mechanism mounting plate 248, which is secured, for example by welding, to the base frame 222 of the cart 202, as may be seen in the various views of this embodiment.

Figure 32:
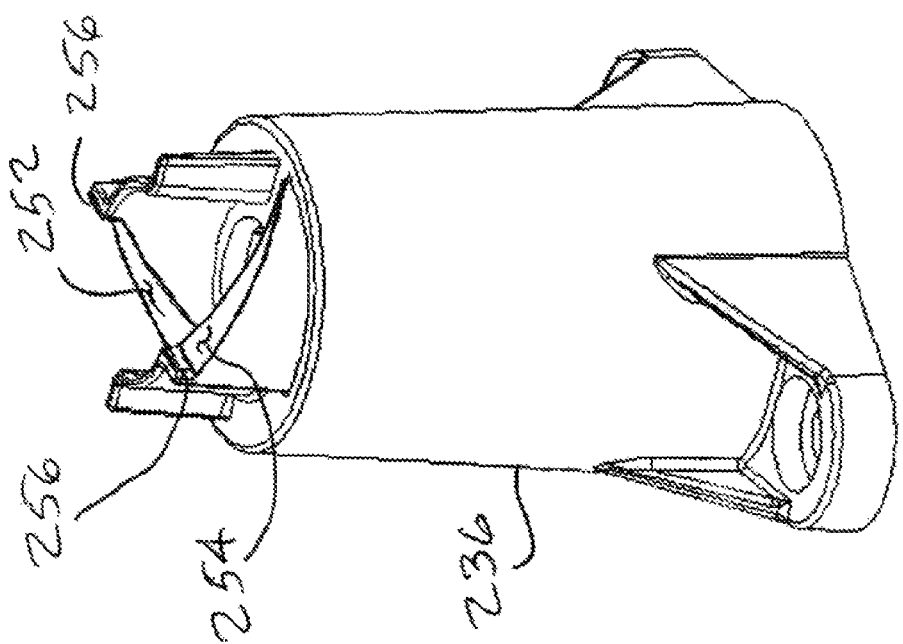
FIG. 32 is a second perspective view of the housing of FIG. 31, rotated 90 degrees about a longitudinal axis.
Figure 31:
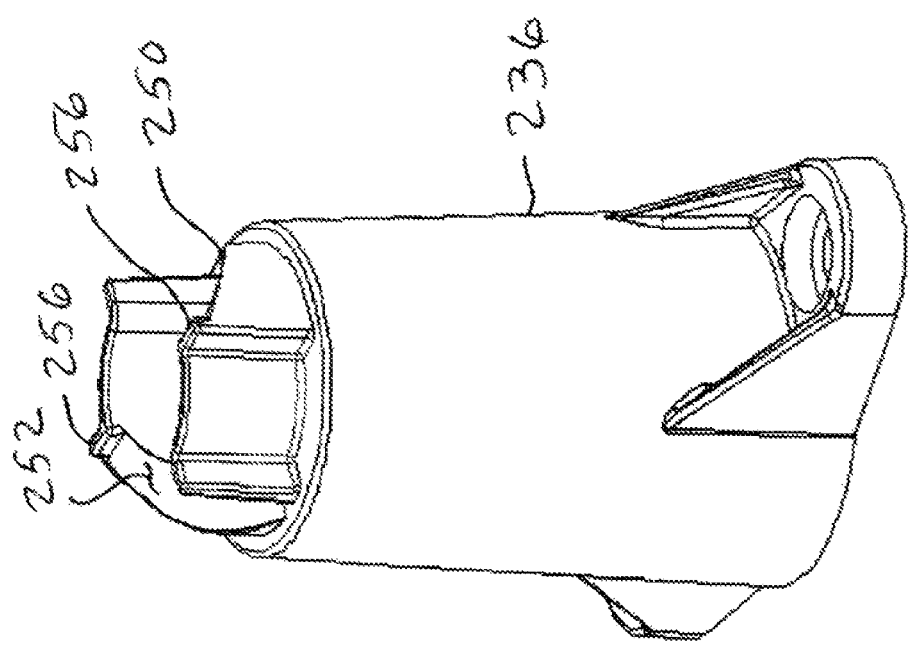
FIG. 31 is a first perspective view of a housing of the latch mechanism of FIG. 29.
Figure 33:
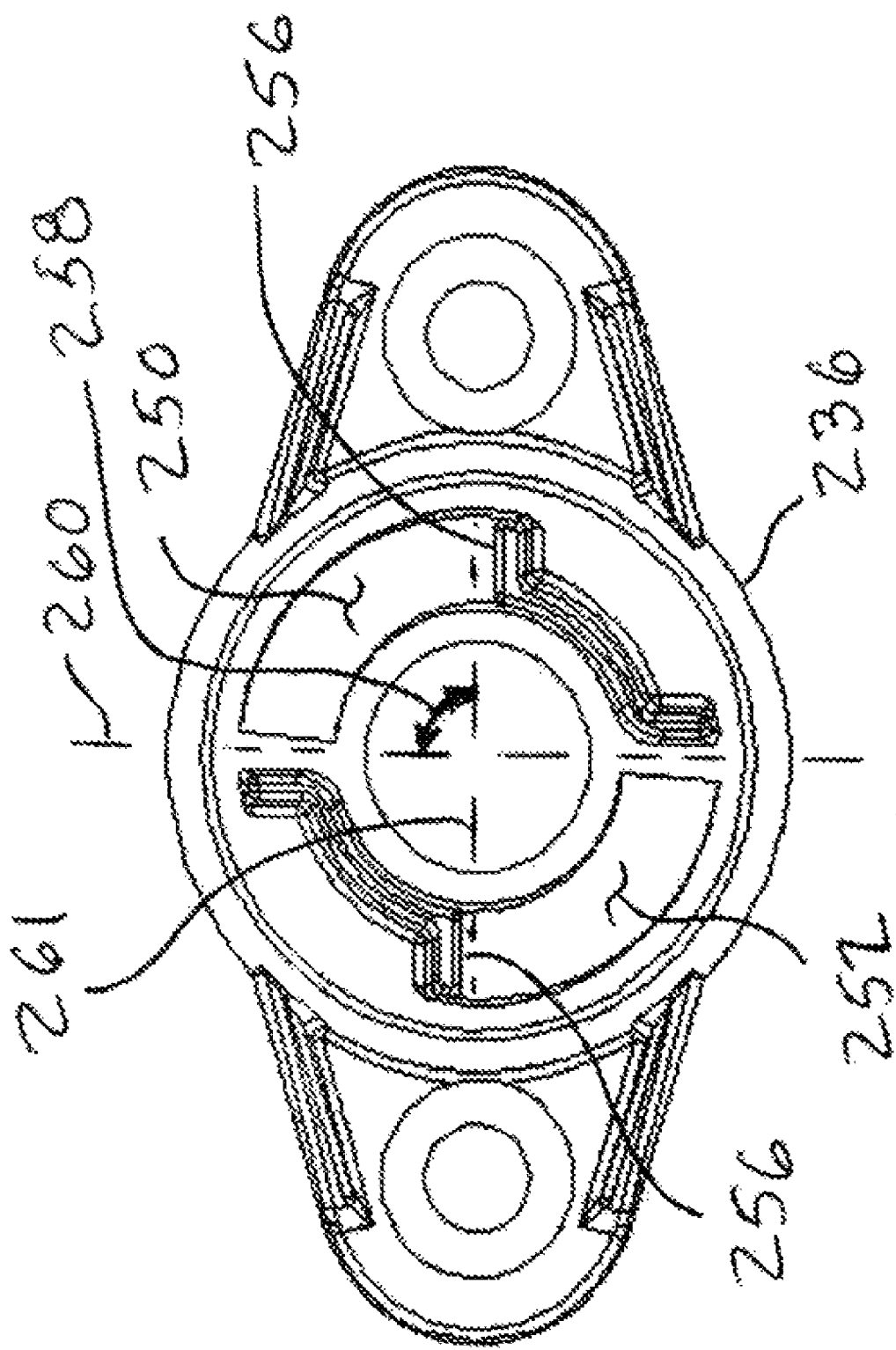
FIG. 33 is a top plan view of the housing of FIG. 31.
Figure 34:
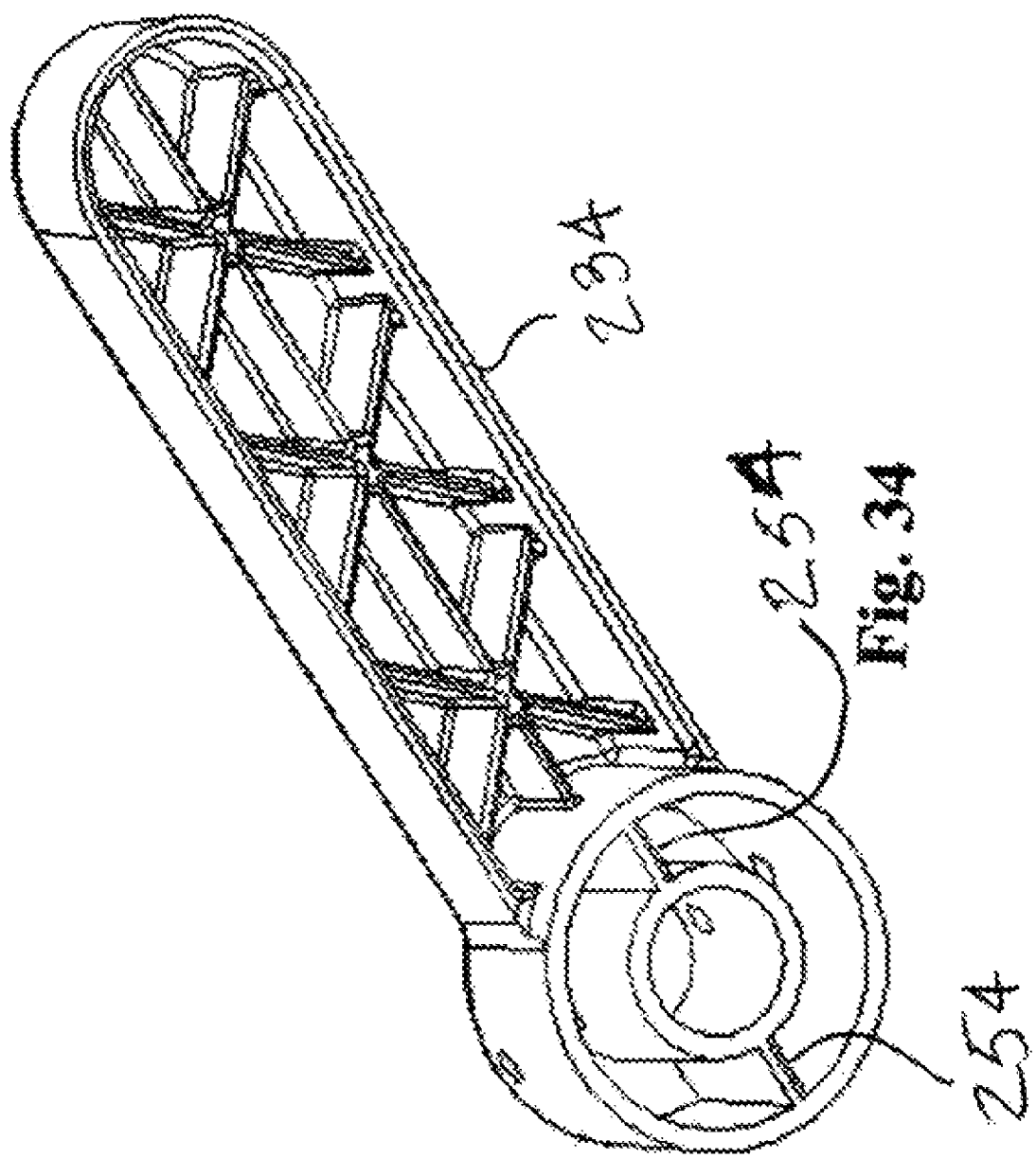
FIG. 34 is a bottom perspective view of a handle of the latch mechanism of FIG. 32.
Figure 35:
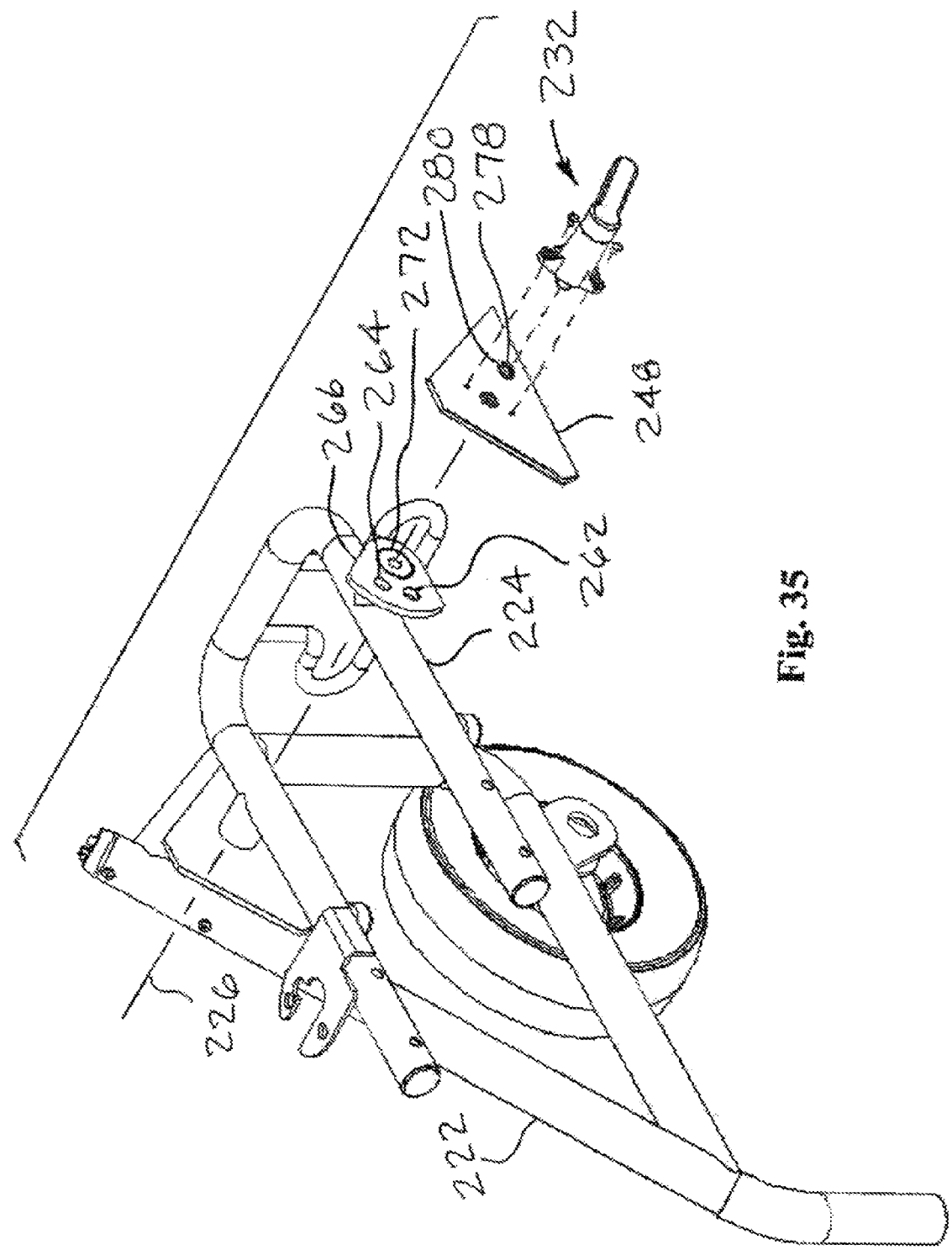
FIG. 35 is an exploded view of certain parts of the assembly of the present invention to illustrate features of the latching mechanism and a pivoting mechanism.

Referring now most particularly to FIGS. 31 and 32, latch housing 236 preferably has a pair of ramps 250, 252. Each of the ramps 250, 252 engage one of a pair of walls or fins 254 on the underside of the handle 234, shown in FIG. 34. Each of ramps 250 and 252 has an elevated stop or barrier 256 at an upper end thereof, to limit the rotational travel of handle 234 with respect to housing 236. As may be seen most clearly from FIG. 33, the rotational travel range 258 is about 90 degrees. The handle 234 and the latch mechanism 232 will return to a LATCHED position (aligned with an axis 260, shown in FIG. 33) when released and the dowel 242 is aligned with one of the two apertures 262 or 264 in a pivot plate 266 (see FIG. 35) because spring 246 will draw handle to that orientation, moving walls 254 along ramps 250 and 252. The LATCHED position of the latch mechanism 232 can occur with the carriage 224 and pump 200 in either the operating position or in the loading position. The pivot plate 266 and apertures 262 and 264 may be seen in FIG. 35, while the location of the pivot plate 266 with respect to the carriage 224 and base frame 222 may be seen in FIGS. 26, 28, 35 and 36. A user may move the latch mechanism 232 to the UNLATCHED position (where the walls 254 of the handle 234 are aligned with an axis 261 shown in FIG. 33). Once the dowel 242 is moved out of alignment with whichever one of apertures 262 or 264 it was previously received in, the dowel 242 will ride on the flat side of pivot plate 266 in the region between the apertures 262 and 264, holding the latch mechanism in the UNLATCHED position while the carriage 224 and pump 200 is moved between the operating and loading positions. Once the dowel 242 is aligned with the other of the apertures 262 or 264, spring 246 will urge the dowel 242 into that other aperture, and the handle 234 will rotate back to the LATCHED position, with the walls 254 driven by the ramps 250 and 252 until the walls 254 of the handle 234 are back in alignment with axis 260 in the housing 236.

Figure 36:
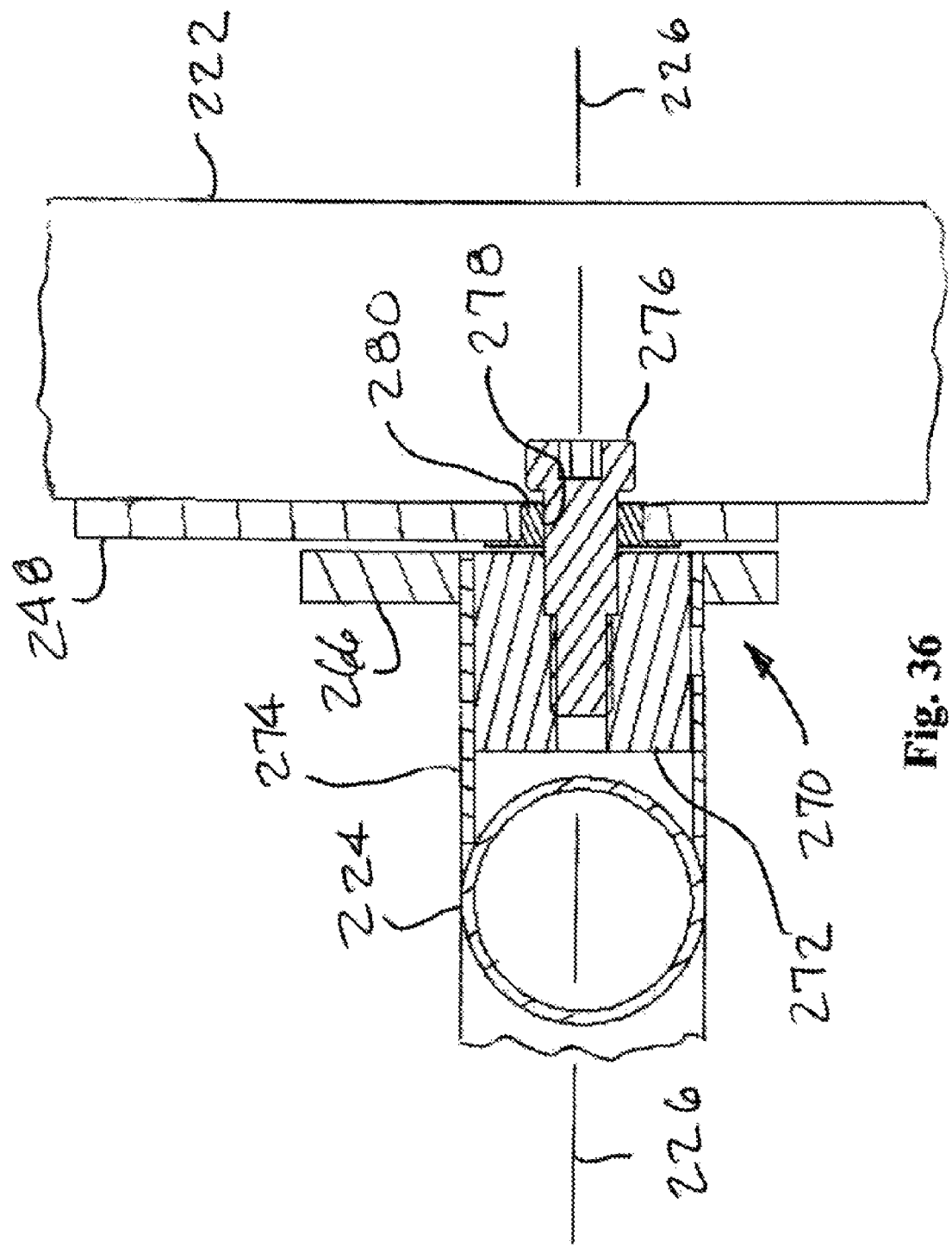
FIG. 36 is a fragmentary section view of one side of the pivoting mechanism of the present invention, taken along line XXXVI-XXXVI of FIG. 20.

Referring now most particularly to FIG. 36, a section view showing details of a pivot mechanism 270 may be seen. A threaded insert 272 is located in an extension 274 branching off of the U-shaped carriage 224 and receives a shoulder bolt 276 passing through an aperture 278 in a bushing received in the latch mechanism mounting plate 248 (see FIGS. 35 and 36).

The invention may thus be seen to be a pivoting connection between a paint pump and a cart on which the pump is mounted, with the pivoting connection permitting the pump to be moved between a down or operating position and an up or loading position.

Optionally, the pivoting connection of the present invention is able to be latched, either manually or automatically, in either of the operating and loading positions. A handle may be included in the practice of the present invention to assist in the latching and unlatching and moving of the pump between the two positions. The handle may be in the form of an elongated member as shown, or other configuration, such as a knob, to permit a user to move the latching mechanism from the LATCHED to the UNLATCHED position.

In the practice of the present invention with certain embodiments, the handle may be moved in a "PULL" direction to unlatch the pump from the cart. The handle may additionally or alternately be moved in a "TILT" direction to move the pump between the up and down (or down and up) positions. Preferably moving or allowing the handle to retract in a direction opposite to the "PULL" direction will relatch the pump to the cart.

In the practice of the present invention with the last described embodiment, the latch mechanism may be actuated by rotating the handle from a LATCHED position to an UNLATCHED position, allowing the carriage to be rotated with respect to the base frame. Once the handle is moved to the UNLATCHED position and the carriage (and pump) is slightly rotated or pivoted, the handle may be released, and the latch mechanism will return to the LATCHED position once one of the apertures in the pivot plate aligns with the latch pin.

The invention is not to be taken as limited to all of the details thereof in the above description, as modifications and variations thereof may be made without departing from the spirit or scope of the invention.

The invention claimed is:

1. A paint pump cart assembly comprising:
   a base frame including a lower section having wheels and feet for supporting the paint pump cart assembly and a cart handle for tilting the base frame and moving the paint pump cart assembly on the wheels;
   a pivot mechanism;
   a carriage pivotably mounted by the pivot mechanism to the base frame;
   a paint pump secured to the carriage, the paint pump having a suction tube and a pump handle on the paint pump; and
   a latching mechanism having an UNLATCHED position in which the carriage and the paint pump are permitted to pivot and a LATCHED position in which pivoting is prevented;
   the pivot mechanism configured to allow the paint pump and carriage to pivot relative to the base frame and the cart handle by a user engaging the pump handle while the base frame and the cart handle remain stationary between
   a. an operating position in which the pump is positioned such that the suction tube is at a position that permits the suction tube to draw paint from a paint container underneath the paint pump and
   b. a loading position in which the pump is positioned such that the suction tube is in a raised position relative to the base frame that permits replacement of the paint container underneath the paint pump, the latching mechanism further configured to releasably enter the LATCHED position when the carriage and paint pump are in the loading position.

2. The assembly of claim 1 wherein the latching mechanism further comprises a handle operative to move the latching mechanism from the LATCHED position to the UNLATCHED position.

3. The assembly of claim 1 wherein the latching mechanism further comprises means for retaining the pump in either the operating position or the loading position.

4. The assembly of claim 3 wherein the latching mechanism remains in the UNLATCHED position when the pump is in an intermediate position between the operating and loading positions.

5. The assembly of claim 4 wherein the latching mechanism automatically returns to the LATCHED position from the UNLATCHED position when the pump moves from the intermediate position to one of the operating and loading positions.

6. A method of moving a cart-mounted paint pump between an operating position and a loading position comprising the steps of:
   a. providing a cart, the cart including:
      a base frame including a lower section having wheels and feet for supporting the cart and a cart handle for tilting the base frame in order to move the cart on the wheels;
      a carriage;
      a pivot mechanism for pivotably mounting the carriage to the base frame;
      a paint pump having a suction tube and a pump handle disposed on the paint pump, the paint pump secured to the carriage; and
      a latching mechanism having an UNLATCHED position in which the carriage and paint pump are permitted to pivot and a LATCHED position in which pivoting is prevented; and
   b. pivoting the paint pump and carriage when the latching mechanism is in the UNLATCHED position by lifting on the pump handle, the pivot mechanism configured to permit the paint pump and the carriage to pivot relative to the base frame and the cart handle while the base frame and the cart handle remain stationary between
      i. an operating position wherein the pump is positioned such that the suction tube is at a position that permits the paint suction tube to draw paint from a paint container under the paint pump, and
      ii. a loading position wherein the pump is positioned such that the suction tube is in a raised position relative to the base frame that permits replacement of the paint container underneath the paint pump without moving the base frame of the cart, the latching mechanism further configured to releasably enter the LATCHED position when the carriage and paint pump are in the loading position.

7. The method of claim 6 further comprising the additional step of
   e. moving a handle to cause the latching mechanism to move from the LATCHED position to the UNLATCHED position.

8. The method of claim 7 further comprising causing the latching mechanism to remain in the UNLATCHED position when the pump is intermediate the operating and loading positions.

9. The method of claim 8 further comprising the additional step of:
   f. automatically returning the latching mechanism to the LATCHED position when the pump is moved to one of the operating and loading positions.

* * * * *